Sept. 15, 1931.  L. H. CLARK  1,823,087
PURIFICATION OF OIL
Filed Feb. 4, 1926
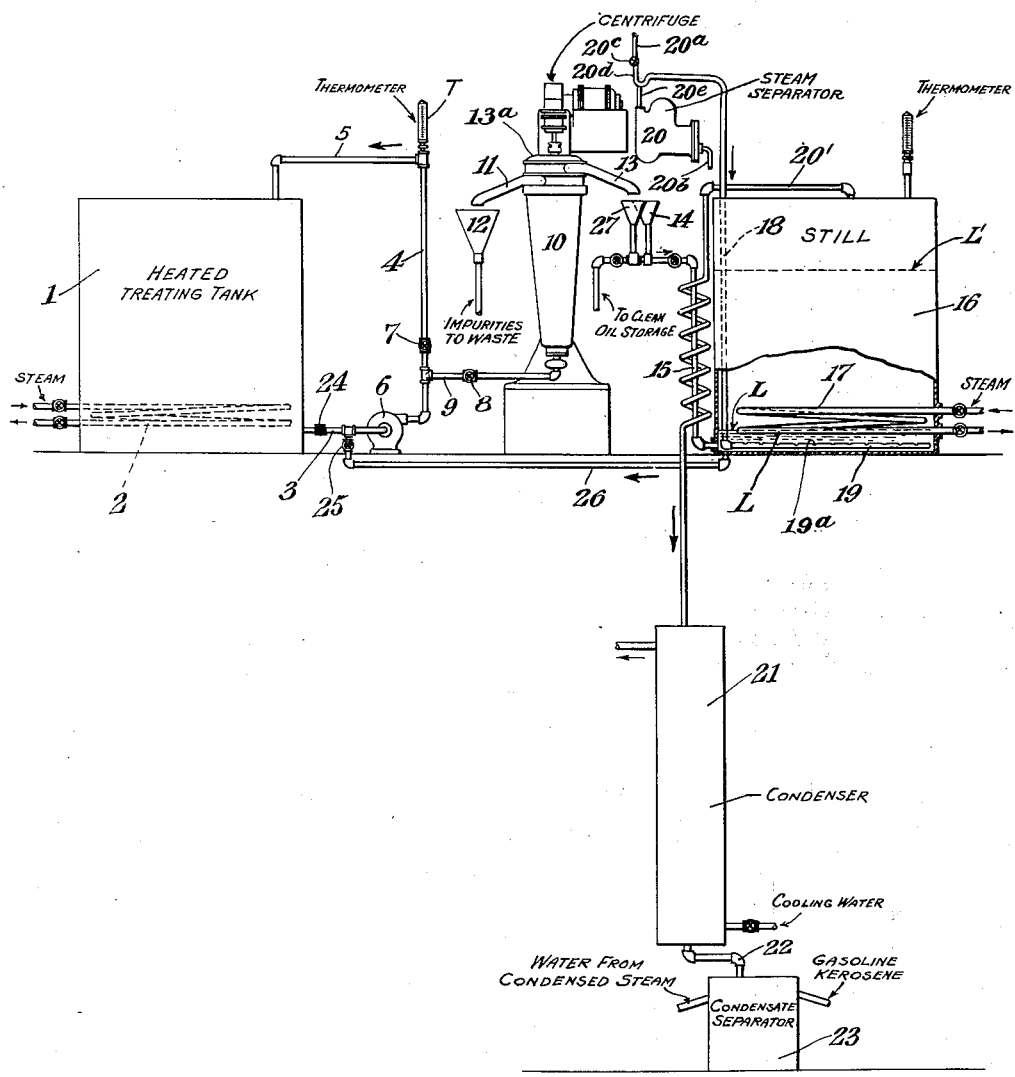
INVENTOR.
Lee H. Clark
BY Kenyon & Kenyon
ATTORNEYS.

Patented Sept. 15, 1931

1,823,087

UNITED STATES PATENT OFFICE

LEE H. CLARK, OF HAVERFORD, PENNSYLVANIA, ASSIGNOR TO THE SHARPLES SPECIALTY COMPANY, OF PHILADELPHIA, PENNSYLVANIA, A CORPORATION OF DELAWARE

PURIFICATION OF OIL

Application filed February 4, 1926. Serial No. 85,876.

My invention relates to the purification of oil and particularly to a method and apparatus for the purification or restoration or renovation of oil that contains some or all of such impurities as products of decomposition or chemical change in the oil or some of its constituents, free fatty acids, water, soaps, sludges usually having an acid reaction and of which some are insoluble in the oil and of which others are soluble in the oil at temperatures above atmospheric temperature, sludge forming substances, oil soluble liquid impurities of lower boiling point than the oil, finely divided carbon which may be wholly or in part colloidal, and other impurities, such impurities having been introduced into the oil during or by reason of the use made of the oil or otherwise.

An object of my invention is to provide a method and apparatus whereby oil that contains some or all of the undesirable substances above enumerated may be brought to a condition wherein it is well adapted to a particular use.

An important example of oil that contains impurities that are removed by the use or in the practise of my invention is oil that has been used for the lubrication of the cylinders of internal combustion engines and particularly such engines of that type as use light hydrocarbon fuel. By the use of my invention and in the practice thereof other oils containing similar impurities may be purified, another example being oil that has become polluted by having more volatile liquids introduced into it in solution.

My copending application Serial No. 75,683, filed December 16, 1925, is directed to a process and apparatus for the purification of oils containing some or all of the above mentioned impurities and the process and apparatus therein described have been practiced or operated with satisfactory results, and my present invention is directed to improvements of that process and apparatus.

In the practice of my invention oils that contain some or all of the above mentioned impurities are first treated with an aqueous reagent that is preferably alkaline and may in some instances contain a colloidal substance, the mixture of oil and alkaline reagent preferably being heated and agitated, then certain of the impurities of the oil and the aqueous phase of the resulting mixture are separated from the oil preferably by centrifugal force, and then the oil is freed of contaminating impurities such as substances of lower boiling point than the oil, that are left in solution in the oil, by a distilling operation that is progressive in that a small body of oil containing dissolved impurities is first subjected to the distilling operation and that body of oil is then added to, continuously or at intervals while the desired distillation is proceeding, steam being advantageously added to further the distillation and preserve the quality of the oil.

In the practice of my invention the aqueous reagent advantageously has the property of dispersing throughout the oil more readily than pure water and the property of facilitating or causing the passage of the impurities of the oil from the oil to the interface between the aqueous reagent and the oil or through that interface into the reagent. Furthermore the aqueous reagent is advantageously a very dilute reagent as hereinafter set forth. Dispersion of the reagent throughout the oil and separation from the oil of impurities and the aqueous phase of the mixture may be facilitated by reducing the viscosity of the oil as by raising its temperature. After the oil has been thoroughly treated with the aqueous reagent and impurities and the aqueous phase of the resulting mixture are separated from the oil, the oil will still contain in solution liquid impurities of lower boiling point than the oil. In this condition the oil is passed to a still and when a desired quantity is collected and its temperature is at, or has been brought to, a point at which steam may be introduced without being condensed, a flow of steam in contact with the oil is initiated and distillation begins. Then further quantities of oil containing impurities in solution are added continuously or intermittently to the body of oil while distillation thereof proceeds, the oil being further heated in any manner, if desired. By using steam in the removal of dissolved contaminating liquids of lower boiling point than the oil, even the contaminating liquids of highest boiling point are satisfactorily removed without injuring the quality of the oil as by cracking or oxidation. Although a priming or foaming of the oil that is being distilled takes place as the contaminating liquids pass off, my process, whereby the distillation begins with a small quantity of oil that is increased continuously or intermittently, makes it possible to satisfactorily remove the contaminating liquids of lower boiling point than the oil in a still of economical proportion and without such passage of oil to the condenser as would contaminate the recovered substances and constitute a loss of oil. Furthermore, in the preferred operation of my invention separation of oil containing dissolved contaminating liquids, from impurities and the aqueous phase of the mixture of impure oil and alkaline reagent, is effected by a centrifugal separator from which the oil containing dissolved contaminating liquids discharges at a rate at which it may be immediately conducted to a still operated, in accordance with my invention, to effect progressive distillation. The vapors passing from the still are condensed and the contaminating liquids may be recovered while the heat of the still vapors may be utilized to heat the oil entering the still. After distillation has been completed the oil is passed through a centrifugal separator to remove any condensed water or other immiscible impurities and to insure that nothing but clean dry oil is finally produced.

Other and further objects and advantages of my invention will appear from the following description and if it be desired that oil treated in accordance with my present invention shall have its resistance to emulsification improved such improvement may be effected in accordance with the inventions described in my Patent No. 1,553,141 issued September 8, 1925 and in my copending applications Ser. No. 29,781, filed May 12, 1925 and Serial No. 42,938, filed July 11, 1925.

In the practice of my invention the aqueous reagent may advantageously consist of an aqueous solution of an alkaline substance such as sodium silicate, sodium aluminate or tri-sodium phosphate. Such alkaline substances as caustic soda and soda ash and still other alkaline substances may be used so long as they produce the desired effect while in solution.

In the practice of my invention the aqueous reagent is advantageously of such concentration and character that water soluble impurities of the oil and products produced by the reaction caused by the reagent will be all, or in a major proportion, in solution in the aqueous phase of the resulting mixture. An effective solution conforming to the requirements above specified may be produced by the use of sodium silicate, particularly sodium silicate in which silica predominates by weight, for example, in which there are 3.25 parts by weight of $SiO_2$ to each part of $Na_2O$ and in which there is an alkalinity, available under the existing conditions though not in every case initially free, equivalent to that of a solution containing ¼% to 1% by weight of caustic soda, a solution having an alkalinity equivalent to such a ½% solution of caustic soda having been found generally effective. Other substances such as sodium aluminate and tri-sodium phosphate may be used. I have found that it is desirable to have in the aqueous reagent a substance in colloidal form and if the alkaline substance used in the reagent does not contain or produce such a colloidal component some substance may be added to the reagent that will impart thereto the desired colloidal characteristics or produce therein the desired colloidal component. In any event excessive alkalinity of the reagent is to be avoided in order that soaps present in the oil or formed with the fatty acid thereof may not be prevented from dissolving in the aqueous phase of the resulting mixture. In the practice of my invention the aqueous reagent is mixed with the oil that is to be purified, in the proportion of one to two parts by volume of aqueous reagent to each ten parts of oil to be purified. In mixing the aqueous reagent with the oil the mixture is advantageously maintained in a heated state, for example, 80° C. to 95° C. The mixing and agitation of the aqueous reagent with the oil may be carried out in various ways, a convenient way being hereinafter more particularly set forth.

The aqueous phase and impurities other than soluble contaminating liquids are then separated from the oil preferably by passing the oil through a centrifugal separator; and, I have found that no process has been suggested by others for purifying oil containing the above mentioned impurities whereby purification may be effected by the use of a centrifugal machine and I have found that no reagents heretofore suggested by others make centrifugal separation of such impurities possible.

With different oils slight variations of the alkaline concentration of the reagent and of the proportion thereof that is mixed with the oil may be necessary to produce the best results. If the oil that is discharged from the centrifugal separator is found by examination or test to be sufficiently freed of impurities other than oil soluble contaminating liquids the alkaline concentration of the reagent and the proportion thereof that is mixed with the oil is correct, but if the oil does not appear to have been sufficiently freed of insoluble impurities, the alkaline concentration or the proportion thereof should be changed. Thus if the oil is not sufficiently freed of insoluble impurities and the aqueous discharge from the separator is turbid but light in shade the degree of the alkaline concentration should be increased. But, if the oil is not sufficiently purified and the aqueous discharge contains a high concentration of removed impurities the proportion of aqueous phase employed should be increased.

To assist in the understanding of my invention I describe the purification by the practice of my process and by the use of apparatus embodying my invention of oil that has been used for the lubrication of cylinders of internal combustion engines using gasoline as fuel but it is to be understood that my invention is not limited to the purification of such oil or to the details set forth.

In the drawing the single figure shows diagrammatically in elevation apparatus embodying and useful in the practice of my invention.

Referring to the drawing the oil to be purified is introduced into the treating tank 1 that is heated in any manner, as by passing steam through the steam coil 2 therein. The aqueous alkaline reagent, which may be made up of sodium silicate or sodium aluminate or sodium tungstate or other compounds that will produce a colloidal substance in the reagent although other alkaline substances may be employed, for example, an aqueous solution containing 2% by weight of sodium silicate of the composition above set out, is introduced to the treating tank in proper proportion and the mixture is agitated, as by passing it through an external circuit consisting of the pipes 3, 4 and 5 in which is interposed a pump 6. The thermometer T indicates the temperature and the heating is so controlled as to bring the mixture to a temperature in the neighborhood of 85° C.

When the impure oil and aqueous reagent are properly mixed and heated the valve 7 in the pipe 4 is partially or fully closed and the valve 8 in the pipe 9 which leads to the centrifuge 10 is partially or fully opened and the mixture passing through the pump 6 is thus partially by-passed or all conducted to the centrifuge 10.

The aqueous discharge from the centrifuge passes through the spout 11 to a waste pipe 12 and its character is carefully examined to insure that the purification is taking place, as set out above. Oil containing dissolved liquid impurities is collected, as it discharges from the bowl of the centrifuge, in receptacle 13a that is so mounted on the centrifugal machine that it may be turned on its axis to swing its spout 13 to positions respectively over the funnels 14 and 27. Oil collected in receptacle 13a is conducted through pipe 15 to the still which comprises a container 16 and means for heating the contents thereof. The still may be heated in any manner, as by the steam coil 17 which is merely a closed heating coil from which no steam escapes into the interior of still 16. When oil has approximately reached the level L in the still and is at a temperature approximately 120° C. to 130° C. steam is admitted through the pipe 18 to a perforated pipe or "spider" 19 in the lower portion of the still. For this purpose there is provided a steam supply pipe 20a controlled by a valve 20c from which steam passes into pipe 18. Pipe 18 conducts the steam to the pipe or "spider" 19 from which it escapes through perforations 19a into the liquid within still 16. To prevent introduction of water into the still a trap 20d is provided from which water is withdrawn through pipe 20e to a steam separator 20 of any standard construction and from which water is automatically expelled in known maner through pipe 20b. As distillation takes place additional quantities of oil are added and the oil level may be raised to approximately the level L'. By utilizing steam the dissolved contaminating liquids of highest boiling point are satisfactorily removed without undue heating or oxidation of the oil and without heating the oil to the boiling point of such contaminating liquids. Although the oil will prime in the still particularly when heavy oils are being treated the progressive charging of the still makes it possible to use a still of economical proportions without causing the oil to pass out with the vapors and the rate at which oil is discharged from the centrifuge is a satisfactory rate for charging oil to the still. The vapors pass from the still 16 through the pipe 20' and this pipe may be brought into heat exchange relation with the pipe 15 that is carrying oil to the still. The pipe 20' conducts the vapors to a condenser 21 from which condensed liquids pass through the pipe 22 to a separator 23 wherein water is separated from contaminating liquids such as gasoline and kerosene.

After the distilling operation is complete, as indicated by tests of viscosity, fire and flash points of the oil, the valve 24 in the pipe 3 and the valve 7 are closed and the valve 25 in the pipe 26 is open while the valve 8 is open and the oil is passed from still 16 through pipe 26, valve 25, pump 6, and pipe 9 to the centrifuge 10 to remove water or other immiscible impurities and the spout 13 is turned to a position over the funnel 27 so that discharged oil may be passed to storage.

In the operation of the above described apparatus a mixture of aqueous alkaline reagent and oil to be treated is heated and agitated in tank 1 by withdrawing the mixture through pipe 3 and passing it back to the top of the tank through pipe 5 by means of pump 6. Then the heated mixture is passed to the centrifuge 10 as described, and from the centrifuge the aqueous phase of the mixture passes to waste through spout 11 while centrifuged oil containing miscible impurities passes through spout 13, funnel 14, and pipe 15 into the bottom of still 16. The contents of the still is heated by steam coil 17 and steam is introduced into the contents of the still through the perforations 19a in pipe 19. Vapors pass from the still through pipe 20' which carries the vapors in heat exchange relation to the oil passing into the still through pipe 15. Then the vapors pass to condenser 21 and the condensate is separated by gravity into water and light hydrocarbons. Oil relieved of contaminating light hydrocarbons is withdrawn from still 16 through pipe 26 and passed again through the centrifuge in which case the oil issuing through spout 13 is delivered into funnel 27 and passed to a storage tank for clean oil. In its second passage through the centrifuge the oil is freed of water with which it became mixed in the still and freed of any other immiscible impurities contained in it.

While I have described my invention in considerable detail I do not intend that my invention shall be limited to such details but intend that it shall include such modifications and variations as fall within the hereunto appended claims.

What I claim and desire to secure by Letters Patent of the United States is:

1. In apparatus of the class described, means for heating and mixing impure oil and an alkaline reagent, a centrifugal separator for the separation from the oil of impurities and the aqueous phase of the resulting mixture, a still, means for heating the contents thereof, means for passing oil from the centrifuge to the still during the heating of the contents thereof, and means for returning oil from the still to the centrifuge.

2. In apparatus of the class described, means for heating and mixing impure oil and an alkaline reagent, a centrifugal separator for the separation of oil from impurities and the aqueous phase of the resulting mixture, a still, means for contacting steam with the contents thereof, means for conducting oil to said still as it discharges from said separator, and means for returning oil discharged from said still to said separator.

3. In apparatus of the class described a first container for oil and aqueous reagent, means for heating and agitating the contents of said container, a centrifugal separator for the separation of oil from impurities and the aqueous phase of the resulting mixture, means for passing the mixture from said first container to said separator, a still comprising a second container, means for continuously passing the oil discharge from said centrifuge to said second container as it discharges from said separator, and means for contacting the contents of said second container with steam.

4. In apparatus of the class described a first container for oil and aqueous reagent, means for heating and agitating the contents of said container, a centrifugal separator for the separation of oil from impurities and the aqueous phase of the resulting mixture, means for passing the mixture from said first container to said separator, a still comprising a second container, a pipe for passing the oil discharge from said separator to said second container, means for contacting the contents of said second container with steam, means for passing vapors from said container in heat exchange relation with oil passing through said pipe, and means for returning the contents of said second container to said separator.

5. In apparatus of the class described a container, a still, a pump, a centrifuge, valve-controlled pipes for conducting the contents of said container and still separately to said pump, valve-controlled pipes for conducting the discharge from said pump separately to said container and to said centrifuge, and means for conducting to said still a liquid discharged from said centrifuge.

6. In apparatus of the class described a container, a still, a pump, a centrifuge, valve-controlled pipes for conducting the contents of said container and still separately to said pump, valve-controlled pipes for conducting the discharge from said pump separately to said container and to said centrifuge, means for conducting to said still a liquid discharged from said centrifuge, and means for heating the contents of said container and still.

7. In apparatus of the class described a container, a still, a pump, a centrifuge, valve-controlled pipes for conducting the contents of said container and still separately to said pump, valve-controlled pipes for conducting the discharge from said pump separately to said container and to said centrifuge, means for conducting to said still a liquid discharged from said centrifuge, means for heating the contents of said container and means for passing steam in contact with the contents of said still.

8. In apparatus for the purification of oil used for the lubrication of cylinders of light-hydrocarbon internal combustion engines, means for heating and agitating a mixture of the oil and an aqueous alkaline reagent, a centrifuge, means for passing the resulting mixture to the centrifuge, a steam still and means for continuously passing the oil discharge of the centrifuge as it discharges therefrom to said steam still during the progress of the distilling operation therein.

9. In the purification of oil that contains products of decomposition, free fatty acids, carbon particles and relatively lower-boiling contaminating liquids in solution, the process comprising mixing and heating the oil with an aqueous alkaline reagent, progressively passing the resulting mixture while still in a heated state to a centrifugal separating operation and thereby separating impurities and the aqueous phase of the resulting mixture from the oil and continuously discharging from the separating operation the oil so purified, continuously passing the oil discharging from the separating operation into a body of similar oil heated to a temperature above the boiling point of water, maintaining a flow of steam in contact with said body of oil and the oil flowing into said body and thereby distilling from the oil the contaminating liquids in solution therein, and controlling the rate of flow of mixture to said separating operation and thereby controlling the rate of flow to said body.

10. In apparatus for the purification of oil used for the lubrication of the cylinders of light-hydrocarbon internal-combustion engines, a container for a mixture of the oil with an aqueous alkaline reagent, a pump having its suction in communication with said container, a centrifuge, pipes for conducting the discharge of said pump separately to said container and to said centrifuge, means for controlling the rate at which said pump passes mixture from said container to said centrifuge, and means for supplying heat to the mixture in said container.

11. In apparatus for the purification of oil used for the lubrication of cylinders of light-hydrocarbon internal-combustion engines, a container for a mixture of the oil with a reagent capable of rendering immiscible impurities separable from the oil, a pump having its suction in communication with said container, a centrifuge for separating impurities and the reagent from the oil, a still for removing soluble contaminating substance from the oil, means for conducting oil discharged from the centrifuge, into the still as it discharges from the centrifuge, and valve controlled pipes for conducting the discharge of said pump to said container and to said centrifuge in proportions determined by the setting of the valves controlling said pipes.

In testimony whereof, I have signed my name to this specification.

LEE H. CLARK.